US011140536B2

(12) United States Patent
McFarthing et al.

(10) Patent No.: US 11,140,536 B2
(45) Date of Patent: Oct. 5, 2021

(54) NEAR ULTRA-LOW ENERGY FIELD (NULEF) HEADSET COMMUNICATIONS

(71) Applicant: QUALCOMM Incorporated, San Diego, CA (US)

(72) Inventors: Anthony McFarthing, Ely (GB); Zafer Boz, Cambridge (GB)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/814,476

(22) Filed: Mar. 10, 2020

(65) Prior Publication Data

US 2021/0204105 A1 Jul. 1, 2021

Related U.S. Application Data

(60) Provisional application No. 62/954,168, filed on Dec. 27, 2019.

(51) Int. Cl.
*H04W 76/15* (2018.01)
*H04W 4/80* (2018.01)
*H04W 88/06* (2009.01)
*H04W 36/00* (2009.01)
*H04W 4/70* (2018.01)
*H04W 88/04* (2009.01)

(52) U.S. Cl.
CPC .............. *H04W 4/80* (2018.02); *H04W 4/70* (2018.02); *H04W 36/0088* (2013.01); *H04W 76/15* (2018.02); *H04W 88/04* (2013.01); *H04W 88/06* (2013.01)

(58) Field of Classification Search
CPC ....... H04W 4/80; H04W 76/15; H04W 88/06; H04W 88/04; H04W 36/0088; H04W 4/70; H04W 76/10; H04W 84/02; H04W 84/12; H04B 3/544; H04B 7/18558
See application file for complete search history.

(56) References Cited

U.S. PATENT DOCUMENTS 8,278,938 B2 * 10/2012 Sexton ................. H02H 11/002
324/539
2010/0304662 A1 * 12/2010 Huang ................... H04H 20/08
455/3.01

(Continued)

FOREIGN PATENT DOCUMENTS

EP  2464143 A1  6/2012

OTHER PUBLICATIONS

International Search Report and Written Opinion—PCT/US2020/062988—ISA/EPO—dated Mar. 10, 2021.

*Primary Examiner* — Andrew Wendell
(74) *Attorney, Agent, or Firm* — Qualcomm Incorporated

(57) ABSTRACT

This disclosure provides systems, methods and apparatuses, including computer programs encoded on computer-readable media, for near ultra-low energy field (NULEF) headset communications. In some aspects, a source device, located in a seat headrest, can generate a modulated magnetic field capable of transferring data via a magnetic communication link, such as a NULEF communication link. The source device can establish a wireless data transfer session with one or more sink devices, and at least one of the sink devices can be implemented to receive data via the NULEF communication link.

26 Claims, 10 Drawing Sheets

(56) References Cited

U.S. PATENT DOCUMENTS

| | | | |
|---|---|---|---|
| 2012/0148077 A1* | 6/2012 | Aldaz | H04R 25/558 |
| | | | 381/315 |
| 2012/0220227 A1* | 8/2012 | Dobyns | H04W 52/46 |
| | | | 455/41.1 |
| 2014/0369170 A1* | 12/2014 | Inha | H04B 5/0006 |
| | | | 367/140 |
| 2016/0308917 A1* | 10/2016 | Veeramani | G06F 3/0383 |
| 2016/0352826 A1* | 12/2016 | Zhou | H04L 65/4092 |
| 2019/0044576 A1* | 2/2019 | Thoen | H04B 5/0031 |
| 2020/0137699 A1* | 4/2020 | Girardier | H04W 56/001 |

* cited by examiner

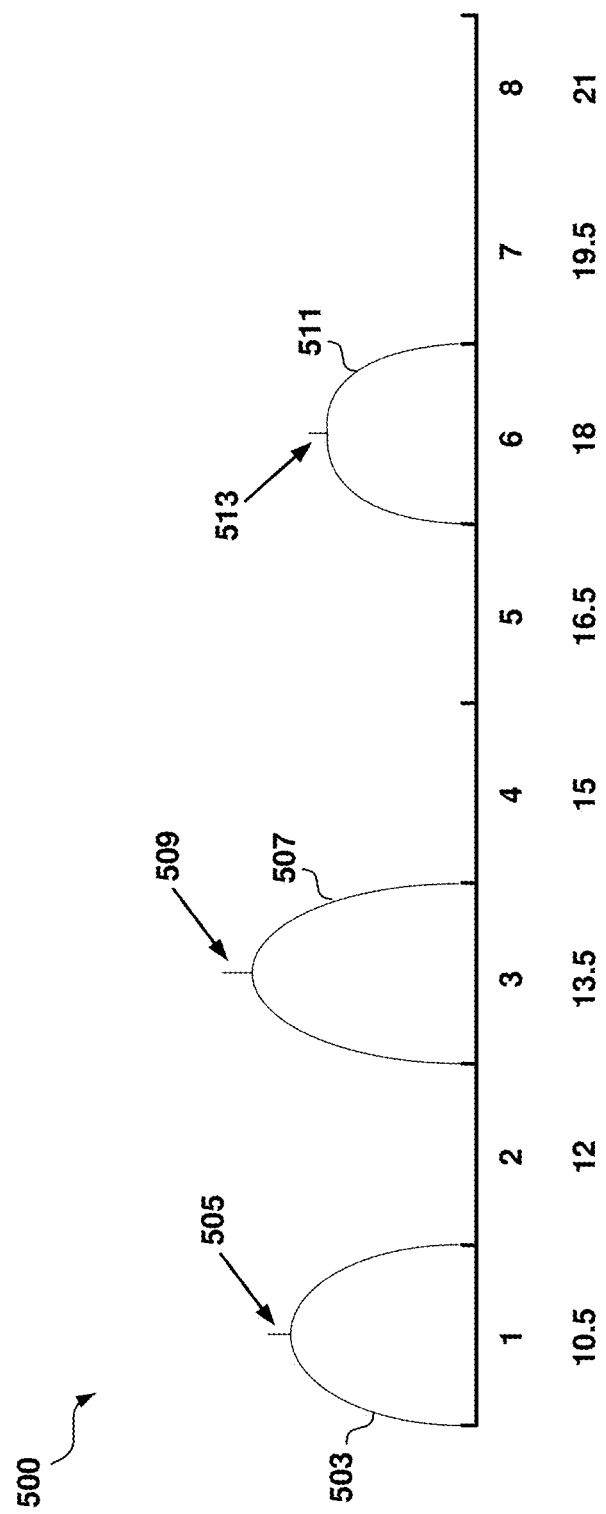

NEAR ULTRA-LOW ENERGY FIELD (NULEF) HEADSET COMMUNICATIONS

CROSS-REFERENCE TO RELATED APPLICATIONS

This Patent Application claims priority to U.S. Provisional Patent Application No. 62/954,168 filed Dec. 27, 2019 entitled "NEAR ULTRA-LOW ENERGY FIELD (NULEF) HEADSET COMMUNICATIONS," and assigned to the assignee hereof. The disclosure of the prior Application is considered part of and is incorporated by reference in this Patent Application.

TECHNICAL FIELD

This disclosure relates generally to communications between electronic devices, and more particularly to reliable wireless communication between electronic devices utilizing magnetic communication technology.

DESCRIPTION OF THE RELATED TECHNOLOGY

Advances in electronic technology have reduced the cost of increasingly complex and useful wireless communication devices. Cost reduction and consumer demand have proliferated the use of wireless communication devices such that they are practically ubiquitous in modern society. As the use of wireless communication devices has expanded, so has the demand for new and improved features of wireless communication devices. More specifically, wireless communication devices that perform new functions, or that perform functions faster, more efficiently or more reliably are often sought after. Furthermore, wireless communication devices that have sustained battery operating times, use less battery power, or provide for lower power communication links are desirable.

SUMMARY

The systems, methods and devices of this disclosure each have several innovative aspects, no single one of which is solely responsible for the desirable attributes disclosed herein.

One innovative aspect of the subject matter described in this disclosure can be implemented in a method of communication between a source device located within a seat headrest and a plurality of sink devices in a local area network (LAN). The method includes generating at the source device, a modulated magnetic field capable of transferring data via a magnetic communication link; establishing a wireless data transfer between the source device and at least one of the plurality of sink devices; and receiving, at the at least one sink device, the data from the source device over the magnetic communication link.

In some implementations, a centralized hub is electrically connected to the source device located within the seat headrest. In some implementations, the centralized hub provides signals to a plurality of source devices, including the source device, within a local environment. In some implementations, the method also includes converting, at the source device, the signals to the data; and transmitting the data over the magnetic communication link to at least one of the plurality of sink devices. In some implementations, the converting includes processing or transforming the signals from the centralized hub to a format understandable by the sink device. In some implementations, the format understandable to the sink device can be a modulated magnetic conversion or transformation of the signals to a data format receivable by the sink device.

In some implementations, the seat headrest is included in one of: an airplane seat, a train seat, a car seat, a bus seat, a cinema seat, a hospital bed, a restaurant seat, or a sporting events seat. In some implementations, the plurality of sink devices are one of a smartphone, an earbud, a pair of earbuds, a tablet device, and a wearable device.

In some implementations, the magnetic communication link is a near-ultra low energy field (NULEF) communication link or near-field magnetic induction (NFMI) communication link. In some implementations, the magnetic communication link operates on a single carrier frequency of eight carrier frequencies, in a band between approximately 9 MHz to 22 MHz.

In some implementations, the method also includes sending the data from the at least one sink device to another sink device over a second magnetic communication link. In some implementations, the second magnetic communication link operates on a different carrier frequency of the eight carrier frequencies than the magnetic communication link. In some implementations, sending the data to the another sink device occurs automatically. In some implementations, sending the data to the another sink device is in response to a request from the another sink device.

Another innovative aspect of the subject matter described in this disclosure can be implemented in a source device associated with a headrest. The source device can be in wireless communication with a plurality of sink devices in a local area network (LAN), and can include a processing system and a first interface. The processing system can be configured to generate a modulated magnetic field capable of transferring data via a magnetic communication link; and establish a wireless data transfer with at least one of the plurality of sink devices. The first interface can be configured to output the data to the at least one sink device over the magnetic communication link.

In some implementations, a centralized hub is electrically connected to the source device. In some implementations, the centralized hub provides signals to a plurality of source devices, including the source device. In some implementations, the processing system is further configured to convert the signals to the data; and transmit the data to the first interface over the magnetic communication link. In some implementations, the converting includes processing or transforming the signals from the centralized hub to a format understandable by the sink device. In some implementations, the format understandable to the sink device can be a modulated magnetic conversion or transformation of the signals to a data format receivable by the sink device.

In some implementations, the headrest is included in one of: an airplane seat, a train seat, a car seat, a bus seat, a cinema seat, a hospital bed, a restaurant seat, or a sporting events seat. In some implementations, a bidirectional telephonic communication link is available through the headrest.

In some implementations, the magnetic communication link is a near-ultra low energy field (NULEF) communication link or near-field magnetic induction (NFMI) communication link. In some implementations, the magnetic communication link operates on a single carrier frequency of eight carrier frequencies, in a band between approximately 9 MHz to 22 MHz.

Additionally, the source device can be implemented to perform any of the aspects of the innovative method described above.

Another innovative aspect of the subject matter described in this disclosure can be implemented in a non-transitory computer-readable medium including processor-executable program code configured to cause a processor of a source device located within a hospital bed to generate a modulated magnetic field capable of transferring data via a magnetic communication link; establish a wireless data transfer between the source device and at least one of a plurality of sink devices; and transmit the data over the magnetic communication link to the at least one sink device.

In some implementations, a centralized hub is electrically connected to the source device, and the centralized hub provides signals to the source device.

In some implementations, the magnetic communication link is a near-ultra low energy field (NULEF) communication link or near-field magnetic induction (NFMI) communication link. In some implementations, the magnetic communication link operates on a single carrier frequency of eight carrier frequencies, in a band between approximately 9 MHz and 22 MHz.

Another innovative aspect of the subject matter described in this disclosure can be implemented in a source device located within a seat. The source device can include means for generating a modulated magnetic field capable of transferring data via a magnetic communication link; means for establishing a wireless data transfer between the source device and at least one of a plurality of sink devices; and means for outputting the data over the magnetic communication link to the at least one sink device.

In some implementations, the magnetic communication link is a near-ultra low energy field (NULEF) communication link or near-field magnetic induction (NFMI) communication link.

In some implementations, the seat is included in one of: an airplane seat, a train seat, a car seat, a bus seat, a cinema seat, a restaurant seat, or a sporting events seat.

In some implementations, a centralized hub is electrically connected to the source device located within the seat. In some implementations, the centralized hub provides signals to a plurality of source devices, including the source device, within a local environment.

In some implementations, the source device also can include means for converting the signals to data. In some implementations, the means for converting includes means for processing or means for transforming the signals from the centralized hub to a format understandable by the sink device. In some implementations, the format understandable to the sink device can be a modulated magnetic conversion or transformation of the signals to a data format receivable by the sink device.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIG. 5A shows a frequency spectrum of example carrier frequencies used in a NULEF magnetic communication system.

Like reference numbers and designations in the various drawings indicate like elements.

DETAILED DESCRIPTION

Figure 1:
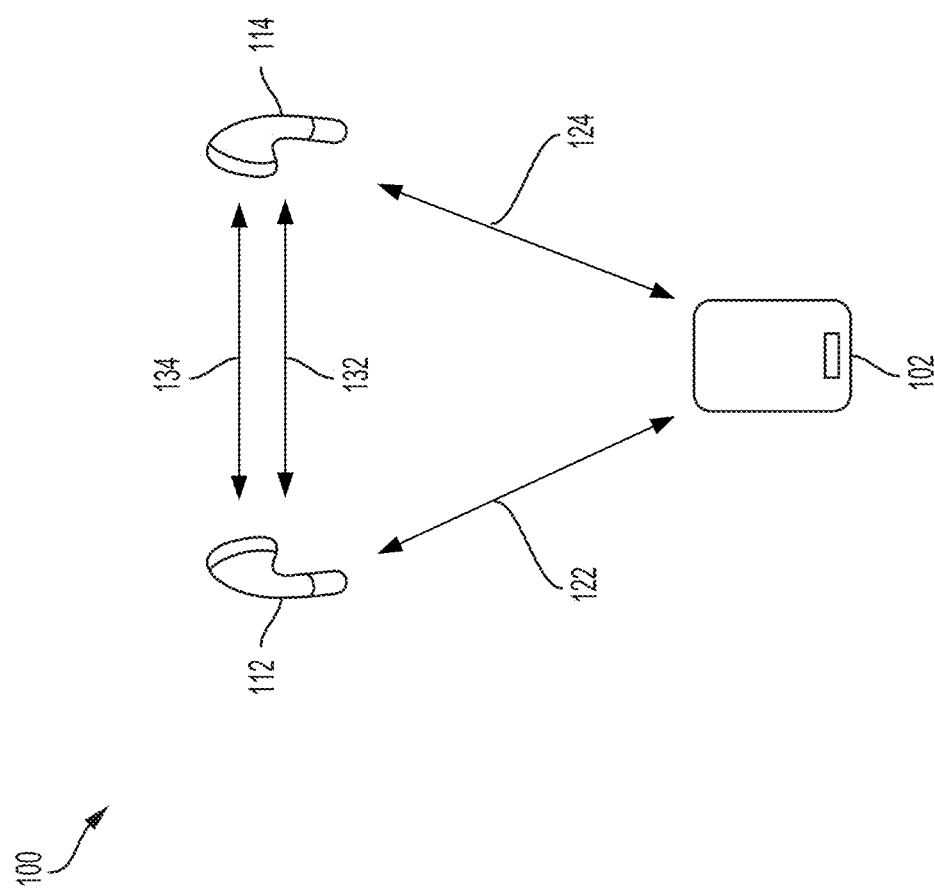
FIG. 1 shows an example topology of a source device communicating with two sink devices.

The following description is directed to certain implementations for the purposes of describing the innovative aspects of this disclosure. However, a person having ordinary skill in the art will readily recognize that the teachings herein can be applied in a multitude of different ways. Some of the examples in this disclosure are based on wireless and wired local area network (LAN) communication according to the Institute of Electrical and Electronics Engineers (IEEE) 802.11 wireless standards (i.e., Wi-Fi), the IEEE 802.3 Ethernet standards, and the IEEE 1901 Powerline communication (PLC) standards. However, the described implementations may be implemented in any device, system or network that is capable of transmitting and receiving RF signals according to any of the wireless communication standards, including any of the IEEE 802.11 standards, the IEEE 802.15 Bluetooth® standards, Bluetooth low energy (BLE), code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G, 5G, or 6G, or further implementations thereof, technology.

The proliferation of wireless devices has accelerated the advancement of short-range wireless communication technologies. The increasing use of smaller wireless devices also has created a need to use short-range wireless communication technologies that allow for lower power communication links in order to provide the most efficient use of battery power. Additionally, short-range wireless communication technologies that reduce interference and congestion in radio frequency (RF) airways is also desirable. For example, in public spaces, such as a restaurant, a cinema, a pub or bar, an airport, on an airplane, in a train, in a car, on a coach, on a bus, at a sporting event, etc., where a high density of people may be seated in close proximity, the RF spectrum may be congested due to people using electronic devices to transmit, receive, or otherwise transfer data over a wireless communication technologies protocol.

The techniques described herein relate to apparatuses, methods and systems supporting magnetic communication technology. Magnetic communication technology can provide short-range communications at much lower power than other known short-range communications. For example, near ultra-low energy field (NULEF) communications is a type of magnetic communication technology that can provide for low power communication links between wireless devices. Moreover, magnetic communication technology, such as NULEF, can be implemented to overcome the limitation of finite bandwidth availability, while still meeting the requirements of a wireless communication system to provide audio services. Such audio services can include music files, video files, or even two-way (or more) communications. Furthermore, use of magnetic communication technology, such as NULEF, can reduce the potential hazard of radio signals affecting sensitive safety-related electronic equipment, such as in a hospital or on an airplane.

Magnetic communications are achieved via modulated magnetic fields that can effectively penetrate many solid objects, including the human body. Magnetic communications may therefore be possible in various communication situations where substantial levels of attenuation otherwise prevent communication via radio frequency (RF) signals or other conventional communication mechanisms. For example, within buildings, underground, or in other environments, signal reflection, absorption, and variations in the permittivity of materials in the propagation path can lead to signal attenuation and selective fading that can in turn increase the effective path loss and thereby prevent the possibility of communication. In contrast, for magnetic signals, the most relevant material property is permeability rather than permittivity (i.e., changes in relative permeability values may affect magnetic field levels). As such, magnetic fields have the ability to penetrate various materials that otherwise interfere with RF signals and thereby permit magnetic communication in scenarios where RF signals may fail.

NULEF magnetic communication technology involves communicating data between a NULEF transmitter and a NULEF receiver via means of magnetic field induction. For example, in some NULEF communication systems the antennas used in the transmitter and receiver are symmetrical so the performance of the transceiver is not compromised when switching between transmit and receive modes, as may occur with other magnetic communication systems, such as a near-field communication (NFC) communication system. In addition, the typical communication range of an NFC communication system is limited to 100 mm or less; whereas, a NULEF communication system can offer increased communication range up to, approximately, five (5) meters depending on antenna sizes.

As described herein, an electronic source device, capable of transmitting and receiving data over a magnetic communication link can be incorporated or integrated into a portion of a seat, such as a headrest of the seat. The electronic source device can be implemented in a wide variety of designs, and can have varying degrees of form factors and functionalities, while located therein, or otherwise associated, with a seat headrest. The electronic source device can use NULEF magnetic communication technology (i.e., a NULEF magnetic communication device) and can communicate with one or more electronic sink devices. The electronic sink devices also can be implemented in a wide variety of designs, and can use NULEF magnetic communication technology for one-way listening, or for two-way communication, using an over-the-air connection with the electronic source device located in the headrest.

In some implementations, such as in the public spaces described above, or otherwise known as a local environment, a centralized hub can be configured to route connections (such as wireless connections, or wired connections) to each seat in the public space. The centralized hub may be configured with media files, such as movies, etc., audio files, such as podcasts, etc., set to be delivered over the connections to the seat headrests. While seated, and within proximity to the NULEF magnetic communication device in the seat headrest, a person can access media from the centralized hub which is delivered via NULEF magnetic communication to a sink device, such as a smartphone or table device, and playable by the person at the sink device. Furthermore, if the person has other sink devices, such as wireless earbuds, audio data also can be sent from the centralized hub and delivered via NULEF magnetic communication to the earbuds, thereby allowing the person to watch and listen to their preferred film, or listen to their favorite audio podcast.

In some implementations, the connections from the centralized hub may enable two or more persons within the public space to communicate with one another while utilizing the NULEF magnetic communication links. In some other implementations, such as in an airplane, by utilizing the NULEF magnetic communication links, as well as a satellite link, a person may engage in two-way communication with someone on the ground. Incorporating NULEF magnetic communication technology in a plurality of source devices located within headrests may create new potentials for data network structures, personalized links, broadcasting and point-to-multipoint communications, auto routing by authentication via the cloud, etc. For example, the ability to include antennas (especially antennas that are large in comparison to mobile devices) in or on a headrest may allow mobile devices to utilize smaller antenna sizes. Reducing antenna sizes in mobile devices enables small form factor devices, such as true wireless stereo (TWS) earbuds, hearing aids, etc.

Particular implementations of the subject matter described in this disclosure can be implemented to realize one or more of the following potential advantages. Exchanging data over a magnetic communication link, which is less prone to interference or disruption over relatively smaller distances, particularly when passing through body tissues, may result in more reliable data communication. As such, sink devices employing magnetic communication technology may avoid the "cross-body problem" of RF devices which occurs when one sink device is placed across, or on the opposite side, of a user's body causing attenuation on the RF link. Moreover, exchanging data between one or more sink devices over a magnetic communication link may reduce the overall power consumption of the sink devices, thereby prolonging battery life. Also, using magnetic communication links for ear-to-ear communication also may simplify the antenna design of an electronic sink device. Furthermore, employing NULEF magnetic communication technology between sink devices in hospitals, airplanes, or other public spaces utilizing sensitive safety-related electronic equipment can reduce the potential hazard of RF signal interference with such equipment. Overall, this may lead to a more robust system in providing spectrum efficiency and safety within a constrained space, without compromising data throughput, the number of users able to access the medium, and security, whilst still maintaining a reliable audio connection.

FIG. 1 shows an example topology 100 of a source device communicating with two sink devices. The source device, or electronic device 102 is capable of wireless communication, and can be implemented to communicate wirelessly with one or more sink devices, such as a first sink device and a second sink device, or earbuds 112, 114. The electronic device 102 can be implemented to establish a wireless data transfer with the earbuds 112, 114.

Source and sink devices, are otherwise known as electronic devices, and may be implemented as any computing device configured to transmit, receive, process and otherwise handle communications, including audio or visual or audio/visual (i.e., video), over a communications network. An electronic device also may be referred to as a wireless node, a smartphone, a mobile device, wireless device, a remote device, a handheld device, or a subscriber device, or some other suitable terminology, where the "device" also may be referred to as a unit, a station, a terminal, or a client. The electronic device also may be referred to as a cellular phone, a personal digital assistant (PDA), a laptop or laptop computer, a tablet device, a personal computer, a gaming console, a virtual or augmented reality device, a drone, an Internet of Things (IoT) device, or other electronic system. IoT devices also may be referred to as an Internet of Everything (IoE) device, an IoT hub, and IoE hub, or any other physical device, vehicle, or home appliance that is embedded with electronics and network connectivity, which enable these objects to connect and exchange data. The IoT device also may be referred to as a virtual assistant device, such as Amazon Alexa®, Google Home®, etc., a wearable device, such as smart watches, Google Glass®, etc., an in-vehicle entertainment or communication system, a home security system, or any device having an interface, such as a network interface, to a communications network and suitable input and output devices. Wearable devices also may be referred to as wearable technology, wearable gadgets, wearables, or some other suitable terminology, which generally describes electronics and software-based technology that is worn on the body, either as an accessory, or as part of material used in clothing.

In some implementations, a source device may be configured to transmit data to one or more sink devices. The sink device, or destination device, can be implemented to receive data over a communications medium from one or more source devices. In some implementations, a source device may be a wireless node and configured to transmit data to one or more sink devices, such as to a smartphone and a pair of earbuds. Earbuds, such as wireless earbuds, wireless headsets, and wireless headphones are example wearable devices, and also can be implemented as sink devices. Some example wireless earbuds include Apple AirPods®, Bose SoundSport®, Philips True Wireless®, and Samsung Gear® earbuds.

A wireless data transfer, or otherwise known as a connection link, wireless connection, wireless communication or communication link, may occur over any suitable communication network that enables wireless devices to communicate with one another over a communication medium. Some example wireless communication technologies include mobile wireless system (MWS) (such as cellular) communications, or wireless connectivity network (WCN) communications. MWS may refer to larger wireless networks, such as wireless wide area networks (WWANs), cellular phone networks, Long Term Evolution (LTE) networks, Global System for Mobile Communications (GSM) networks, code division multiple access (CDMA) networks, CDMA2000 networks, wideband CDMA (W-CDMA) networks, Universal mobile Telecommunications System (UMTS) networks, Worldwide Interoperability for Microwave Access (WiMAX) networks, etc. WCN may refer to relatively smaller wireless networks, such as wireless local area networks (WLANs), wireless personal area networks (WPANs), IEEE 802.15 Bluetooth® (BT) networks, Bluetooth low energy (BLE) networks, BT SIG specifications and profiles, wireless Universal Serial Bus (USB) networks, ZigBee, Wi-Fi (i.e., Institute of Electrical and Electronics Engineers (IEEE) 802.11) networks, in addition to magnetic communication technologies, such as near ultra-low energy field (NULEF) communications, near-field communications (NFC), and near-field magnetic induction (NFMI) communications.

Other protocols that can be used to form communication networks can include, radio-frequency identification (RFID) technology, the Internet Protocol ("IP"), Transmission Control Protocol ("TCP"), User Datagram Protocol ("UDP"), device-to-device (D2D) protocols, Long-Term Evolution direct (LTE-D), narrow band Internet of Things (NB-IoT), LTE category M (LTE CAT-M), Vehicle to X (V2X), fifth generation (5G) new radio (NR), or other such types of protocols described throughout this disclosure. Some electronic devices may utilize multiple wireless communication technologies or protocols.

Communications in a wireless communication system may be achieved through transmissions over a wireless link. Such a wireless link may be established via a single-input and single-output (SISO), multiple-input and single-output (MISO), or a multiple-input and multiple-output (MIMO) system. A MIMO system includes transmitter(s) and receiver(s) equipped, respectively, with multiple (NT) transmit antennas and multiple (NR) receiver antennas for data transmission. In some implementations, a MIMO system can provide improved performance, such as higher throughput, greater capacity, or improved reliability, if the additional functionality created by the multiple transmit and receiver antennas are utilized properly.

The electronic device 102 can be implemented to communicate directly or indirectly with the earbuds 112, 114, respectively, using any wireless communication technologies or protocols described above. Additionally, the earbuds 112, 114 can be implemented to communicate with each other using any wireless communication technologies or protocols described above.

In a typical system, the electronic device 102 can be implemented to establish a wireless data transfer, such as by using Bluetooth or BLE, with at least one of the earbuds 112, 114 over at least one of the communication links 122, 124. Upon establishment of the wireless data transfer, the electronic device 102 can commence transmitting a data stream to at least one of the earbuds 112, 114.

In some implementations, whichever of the earbuds is closest in proximity to the electronic device 102 may establish the wireless data transfer with the electronic device 102. In some other implementations, whichever of the earbuds is experiencing the more favorable, or clearest radio channel conditions may establish the wireless data transfer with the electronic device 102. Determining which earbud has the clearest wireless connection, or more favorable radio communication conditions, can be evaluated based on the earbud having the strongest Received Signal Strength Indication (RSSI) characteristic, receipt of protocol acknowledgements, or the least amount of interference (such as by determining which earbud has the fewest cyclic redundancy check (CRC) errors), or least amount of attenuation measured between the electronic device 102 and the earbuds 112, 114. As described throughout, the phrase "based on" does not mean "based only on," unless expressly specified otherwise. In other words, the phrase "based on" describes both "based only on" and "based at least on." Upon establishing the wireless data transfer with the preferred, or first, earbud the electronic device 102 can commence transmitting data. In some implementations, such as in a transmission environment experiencing lower levels of interference, the data stream may be received by both of the earbuds 112, 114 over the communication links 122, 124, respectively.

Regardless of whichever of the earbuds establishes the wireless data transfer session with the electronic device 102, each of the earbuds 112, 114 can be implemented to establish a communication link 132, 134, respectively, with the other earbud, and can begin relaying the received data stream to the other earbud. Again, in a typical system, the earbuds 112, 114 can communicate with each other over the communication links 132, 134, such as by using Bluetooth or BLE master and slave topology. Each of the communication links 122, 124, 132 and 134 can be implemented as fully bidirectional.

In environments where a high density of people may be using electronic devices, the wireless communications coming to and from those electronic devices may make the radio frequency (RF) airways in the environment congested. In such congested, noisy, or otherwise interference-heavy transmission environments, Bluetooth, BLE and Wi-Fi communications over the communication links 122, 124 may be blocked. The blocking may be due to asynchronous interferers, such as from electronic devices using Wi-Fi, BLE or Bluetooth, especially in the 2.4 GHz-2.5 GHz frequency bands, or other degradation of the communication links 122, 124 in the crowded environment. Degradation of the communication links 122, 124 may introduce unwanted re-transmissions from one or more of the electronic devices. In some implementations, re-transmission may reduce battery life for portable electronic devices, and may increase over-the-air spectrum occupancy or spectrum pollution. The blocking can be further exacerbated, especially in high-density user environments, when the electronic devices are operating in the industrial, scientific and medical (ISM) band which utilizes the same frequency spectrum.

To overcome the limitations of finite bandwidth availability, this disclosure proposes using magnetic communication technologies for communication between the electronic device 102 and the earbuds 112, 114. In other words, the electronic device 102 can use a magnetic communication technology to transmit one or more data streams over the communication links 122, 124 to the respective earbuds 112, 114. The magnetic communication technology can be implemented as a near-field communication (NFC) link, a near-field magnetic induction (NFMI) link, or a near ultra-low energy field (NULEF) link. Magnetic communication links are generally not subject to attenuation from a user's head, body, or other obstruction, and are therefore more reliable over relatively short distances, such as one centimeter (cm) to five meters (m), or more particularly, like one cm to thirty cm for antenna sizes compatible with most commercial earbuds. To transmit and receive data over a magnetic communication link, the electronic device 102 and the earbuds 112, 114 can each be implemented to include a magnetic communication link radio and antenna.

In addition to receiving a data stream from the electronic device 102 over a magnetic communication link, the earbuds 112, 114 can be implemented to communicate with one another via magnetic communication technology over the communication links 132, 134. If an interruption, or interference, occurs between the electronic device 102 and the earbuds 112, 114 on either of the communication links 122, 124, the earbud 112, 114 receiving the data stream can be implemented to forward, or otherwise relay, the intended data stream to the other earbud 112, 114 via magnetic communication technology over the communication links 132, 134. Each of the communication links 122, 124, 132 and 134 can be implemented as NULEF magnetic communication fields and again, fully bidirectional. Each of the communication links 122, 124, 132 and 134 also can operate in a mesh network, where the data stream may be shared via wireless communication technologies, or magnetic communication technologies.

In some implementations, the earbuds 112, 114 can be configured to automatically forward, or otherwise relay, received data streams to the other earbud using magnetic communication technology over communication links 132, 134. For example, the electronic device 102 can broadcast an audio data stream using magnetic communication technology, or any of the wireless communication technologies described above, to be received by the earbuds 112, 114. In some implementations, the broadcasted audio data stream can include stereo audio data for both the earbuds 112, 114. The stereo audio data can, for example, include left and right channel audio signals intended for the respective earbuds 112, 114. At other times, the audio data stream might include audio received from a phone call, or the voice of a virtual assistant such as Alexa®, Ski® or Cortana®, for example. Upon receiving a broadcasted stereo audio data for both earbud 112 and earbud 114, the earbud 112 can be implemented to forward, or otherwise relay, the stereo audio data intended for earbud 114 over the magnetic communication link 134. Similarly, upon receiving the broadcasted stereo audio data for both earbud 112 and earbud 114, the earbud 114 can be implemented to forward, or otherwise relay, the stereo audio data intended for earbud 112 over the magnetic communication link 132. This forwarding implementation ensures that the earbuds 112, 114 receive the stereo audio data even if the broadcasted audio data stream over one of the communication links 122, 124 is interrupted, blocked, or broken due to interference or other degradation on the communication links 122, 124.

In some other implementations, the data stream can be forwarded over a magnetic communication link upon receiving a forwarding request over a magnetic communication link from the other earbud. For example, upon receiving the data stream for both earbud 112 and earbud 114, the earbud 112 can be implemented to forward, or otherwise relay, the data stream intended for earbud 114 over the magnetic communication link 134 only upon receiving a forwarding request from the earbud 114 over the magnetic communication link 132. In such implementations, power savings can be achieved, as the earbud 112 is not required to automatically forward, send, transmit, or otherwise relay, the stereo audio data to the earbud 114, and instead only forwards the stereo audio data intended for the earbud 114 upon request from the earbud 114. The power savings associated with this implementation may come at the expense of a time delay, given that the earbud 114 must first request its respective stereo audio data from the earbud 112. Similarly, upon receiving the data stream for both earbud 112 and earbud 114, the earbud 114 can be implemented to forward, or otherwise relay, the data stream intended for earbud 112 over the magnetic communication link 132 only upon receiving a forwarding request from the earbud 112 over the magnetic communication link 134.

In some other implementations, such as in a true wireless stereo (TWS) implementation, the electronic device 102 can establish a separate data transfer with each of the earbuds 112, 114. In such an implementation, the electronic device 102 can connect with the earbuds 112, 114 over two separate magnetic communication links 122, 124, respectively, where, for example, left channel audio data is transmitted to the earbud 112 and right channel audio data is transmitted to the earbud 114. The earbuds 112, 114 can be implemented to establish a secondary magnetic communication link connection amongst themselves over communication links 132, 134.

Figure 2:
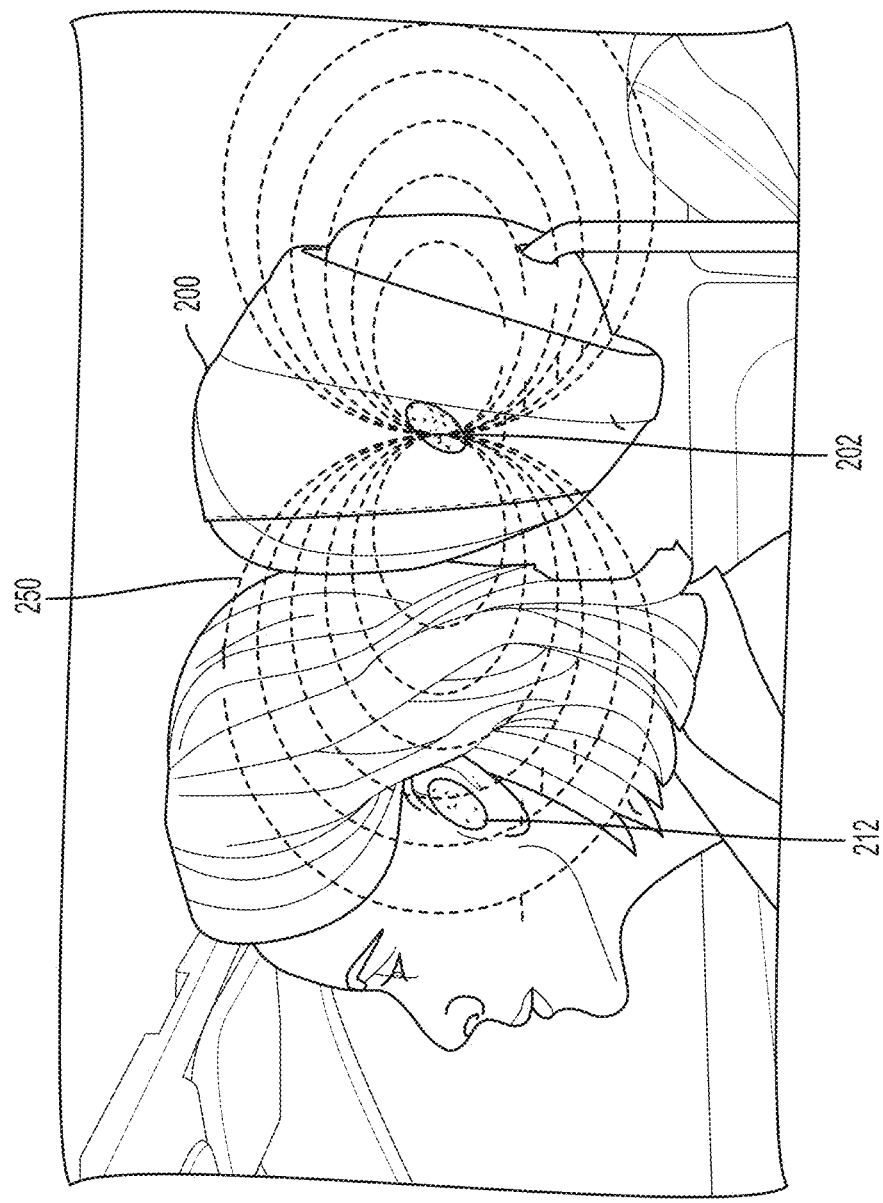
FIG. 2 shows an example of a source device in a headrest communicating with at least one sink device.

FIG. 2 shows an example of a source device in a headrest 200 communicating with at least one sink device. The source device, or electronic device 202, is capable of wireless communication with at least one sink device, or earbud 212. The earbud 212 can be implemented as a wireless earbud, earpiece, or headset. As depicted in FIG. 2, the electronic device 202 is located within a headrest 200. The headrest 200 can be associated with a seat in a motor vehicle, as depicted, but a person having ordinary skill in the art will readily recognize that the headrest 200 can be associated with a seat in a bus, a train, an airplane, a restaurant seat, a couch, a recliner, a cinema or movie theatre, a pub or bar, a sporting event seat, or in fact any type of seat. In some implementations, the electronic device 202 can be integrated into another part of the seat other than the headrest, such as in an armrest, the back of the seat, etc. The electronic device 202 can be implemented to receive wired or wireless signals. For example, the electronic device 202 located within the headrest of a motor vehicle can receive wired signals via PLC technology, or wireless signals via cellular technology. The electronic device 202 can be implemented to convert the received signals to data, and can be implemented to prepare the data for transmission to the earbud 212. In some implementations, the converting includes processing or transforming the signals from the centralized hub to a format understandable by the sink device. In some implementations, the format understandable to the sink device can be a modulated magnetic conversion or transformation of the signals to a data format receivable by the sink device. In some implementations, the earbud 212 can include a microphone. The microphone in the earbud 212 can be implemented to pick up the voice of a user, and transfer a voice signal back to the electronic device 202 in the headrest 200. As such, a telephonic communication link (i.e., cellular, voice-over Internet Protocol (VoIP), voice-over Long Term Evolution (VoLTE), etc.) is possible through the headrest 200.

The electronic device 202 can be implemented to generate a modulated magnetic field 250 that transfers, via a magnetic link, data to the earbud 212. As depicted in FIG. 2, the modulated magnetic field 250 can emanate radially or omni-directionally from the electronic device 202. As such, although not depicted in FIG. 2, another sink device, or earbud 214, located in the motor vehicle driver's other ear also can be implemented to receive data via the magnetic link. In some implementations, the magnetic link can be a NULEF link. In some implementations, the electronic device 202 in the seat, such as in the headrest, can be implemented to communicate magnetically (such as via the NULEF link) with the earbuds 212 and 214 (not depicted, but assumed to be in the other ear) over a relatively short distance, such as approximately one (1) meter. In other words, using the magnetic communication technology, which provides a lower power alternative over limited distances as compared to RF wireless communication technology, the headrest incorporating the electronic device 202 can communicate with the earbuds 212 and 214 (worn on the human body) at a distance of approximately 1 meter or less (such as 60 centimeters (cm), 30 cm, 10 cm, etc.). In this way, when a human body using a sink device, such as the earbuds 212 and 214, or another wearable device (such as a smartwatch, etc.), occupies a seat and the sink device is placed in proximity to the source device, such as the electronic device 202, located in the headrest, the magnetic communication technology link can connect the source device to the sink device. Thus, when two devices are within the limited but sufficient proximity of one another, the modulated magnetic field emanating from the electronic device 202 in the seat headrest can provide data (such as multimedia data, like audio and video, or telecommunication data, etc.) to the earbud 212.

In some implementations, the electronic device 202 integrated into the seat, such as in the seat headrest, can be configured to detect when the seat is occupied, such as by a human body. In such an implementation, the electronic device 202 can remain in a lower power, de-energized, or even in an powered down status until the electronic device 202, or a sensor (such as a presence sensor, body temperature sensor, weight sensor, location sensor, proximity sensor, thermal sensor, etc.) associated with the electronic device 202, detects that a user is in the seat. Once the electronic device 202, or the sensor associated with the electronic device 202, detects or determines that the seat is being used, the electronic device 202 can be implemented to change from a lower power mode to an energized or operational mode. In such an energized or operational mode, the electronic device 202 can be implemented to communicate its status to a centralized hub (such as a multimedia serving device, etc.), thereby saving power not only at the electronic device 202 itself, but also in the centralized hub system. Once in the energized or operational mode, the electronic device 202 also can be implemented to initiate a magnetic communication link, such as a NULEF link, with the earbuds 212 and 214. In some other implementations, the electronic device 202, or the sensor associated with the electronic device 202, can detect whether or not the human body positioned in the seat is operating a sink device, such as the earbuds 212 and 214, and once the earbuds 212 and 214 are detected, the electronic device can be configured to switch from a lower power mode to an energized or operational mode, ready to deliver modulated magnetic field signals or data to the earbuds 212 and 214.

Figure 3A:
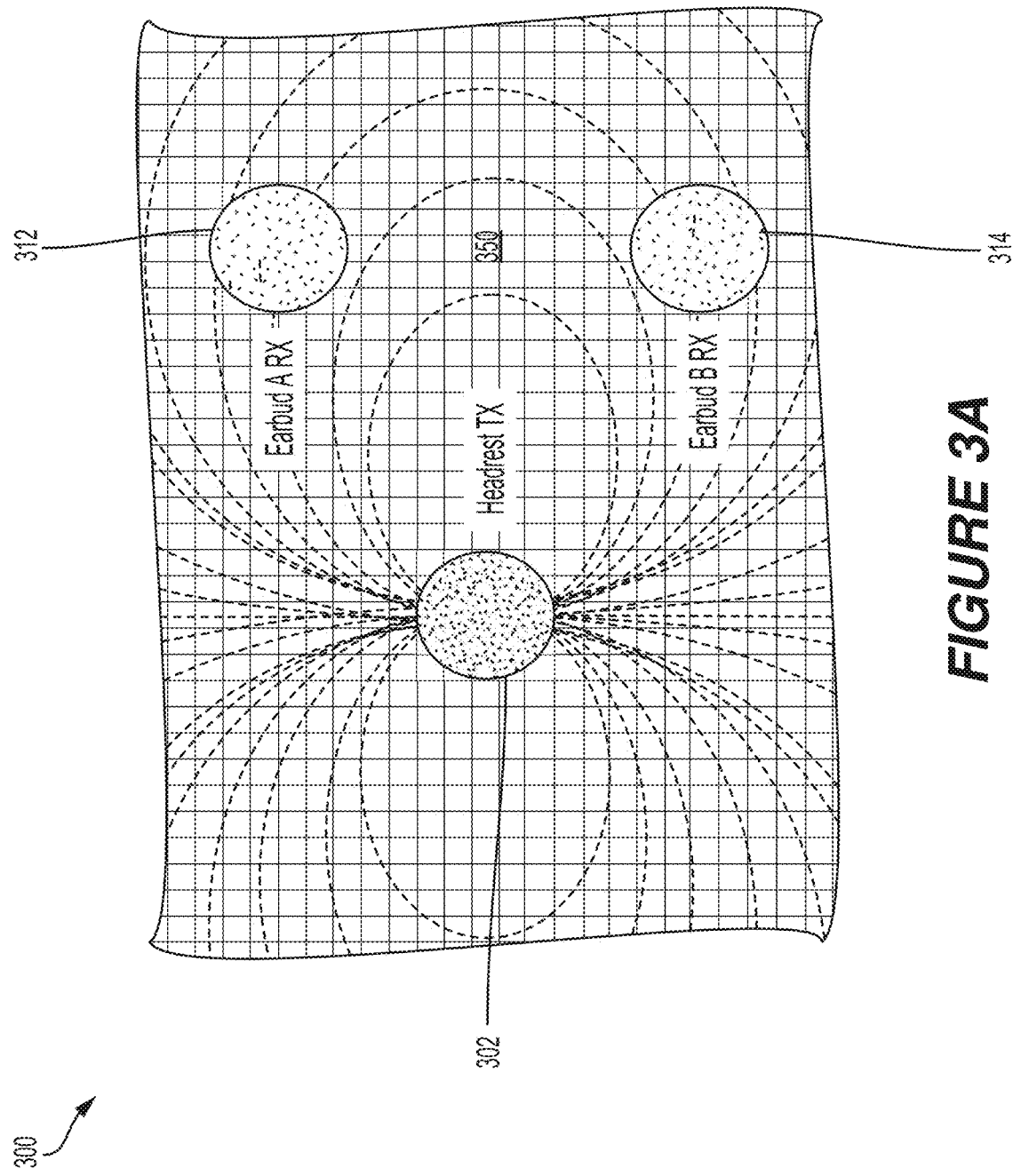
FIG. 3A shows an example of a source device generating a modulated magnetic field for communicating with two sink devices.

FIG. 3A shows an example 300 of a source device generating a modulated magnetic field 350 for communicating with two sink devices. The source device, or electronic device 302, is capable of communicating, via a magnetic communication link, with the two sink devices, or the earbuds 312, 314. The electronic device 302 can be located in a headrest (i.e., a headrest transmitting device, or Headrest TX device), such as the headrest 200 depicted and described in FIG. 2. The modulated magnetic field 350 can be implemented to enable the transmission of data over a magnetic communication link. For example, the modulated magnetic field 350 can be implemented to enable the electronic device 302 to transmit an audio data stream over a NULEF magnetic communication link to the earbuds 312, 314. The earbuds 312, 314 (i.e., Earbud A RX and Earbud B RX) can be implemented to receive the data from the electronic device 302 directly, or to receive the data as relayed from the other earbud. In some implementations, the earbuds 312, 314 also can become source devices by communicating voice signals received (or detected) from the user back to the electronic device 302 in the headrest. In this way, two-way mobile communications can be enabled using NULEF magnetic fields.

Figure 3B:
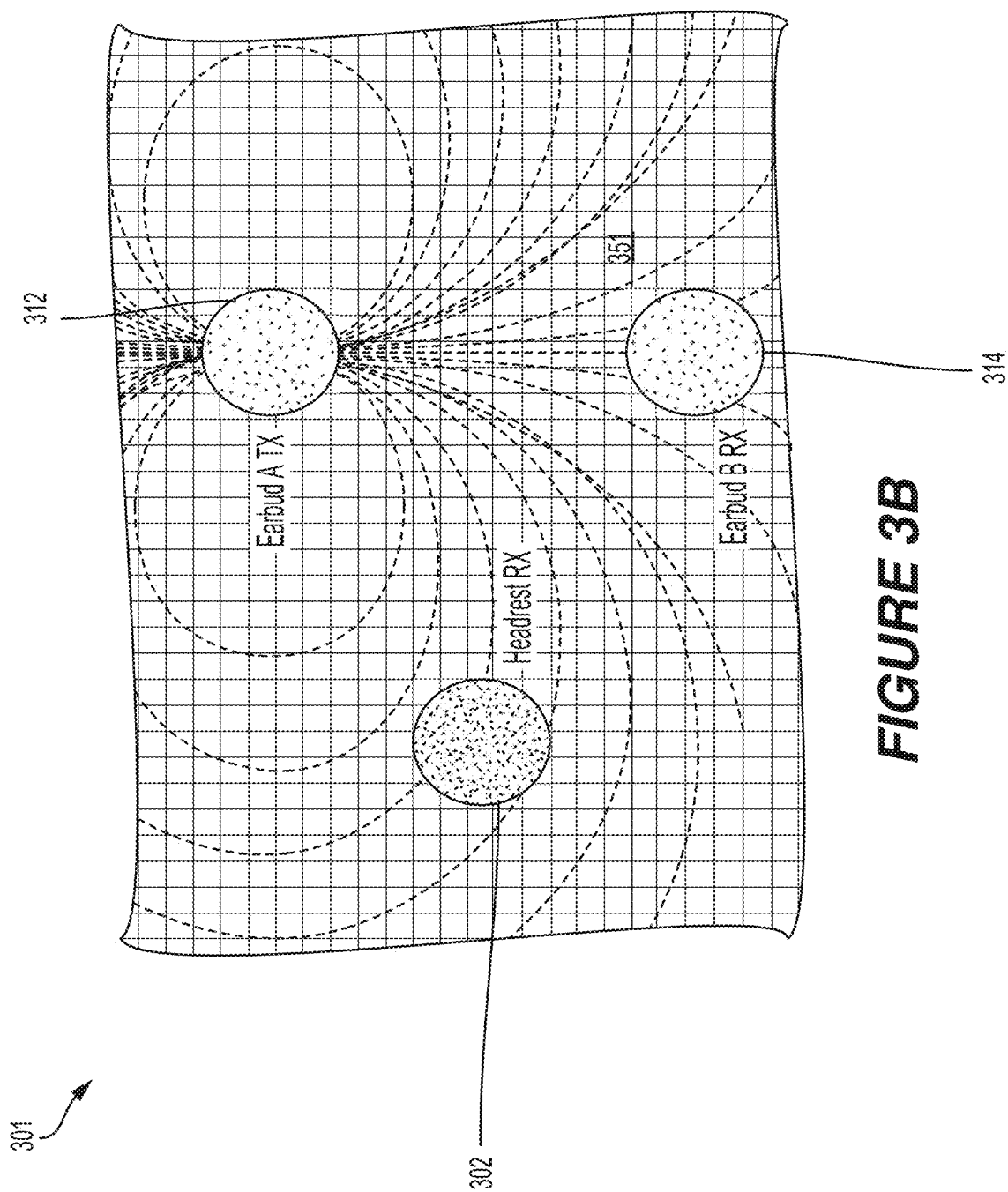
FIG. 3B shows an example of a sink device transmitting data to another sink device over a magnetic communication link.

FIG. 3B shows an example 301 of a sink device transmitting data to another sink device over a magnetic communication link. In the depicted example 301, the sink device, or the earbud 312 is implemented as a transmitting device (i.e., Earbud A TX), and is sending data to the other sink device, or the earbud 314 via a magnetic communication link through the modulated magnetic field 351. Such an implementation can arise when the earbud 314, for whatever reason, fails to receive the intended data transmitted by the electronic device 302; the earbud 312, after receiving the data transmitted by the electronic device 302, can in turn pass, relay, or otherwise forward the data to the earbud 314 over a magnetic communication link. In such an implementation, the electronic device 302 (i.e., Headrest RX) also can receive the data from the earbud 312 over the magnetic communication link.

When the magnetic communication link in the examples 300 and 301, depicted and described in FIGS. 3A and 3B, is a NULEF magnetic communication link, the communications in the local area network (LAN), very local area network (VLAN) (i.e., a smaller network in terms of distance between devices, such as on the order from 10 centimeters (cm) to 1 meter (m), etc.), or personal area network (PAN), occur on one carrier frequency. NULEF operates on eight carrier frequencies, nominally in a frequency band between 9 megahertz (MHz) and 22 MHz, such as between 10 MHz and 20 MHz. A person having ordinary skill in the art will readily recognize that the selected carrier frequency for one LAN or VLAN should be different than the selected carrier frequency for an adjacent or nearby LAN or VLAN so as to mitigate the potential for interference. NULEF communications also occur in a time division multiplexed (TDM) format. So, returning to the examples 300 and 301, depicted and described in FIGS. 3A and 3B, the NULEF magnetic communication links between the electronic device 302 and the earbuds 312, 314 occurring over the modulated magnetic fields 350 and 351, respectively, are in TDM format.

Figure 4:
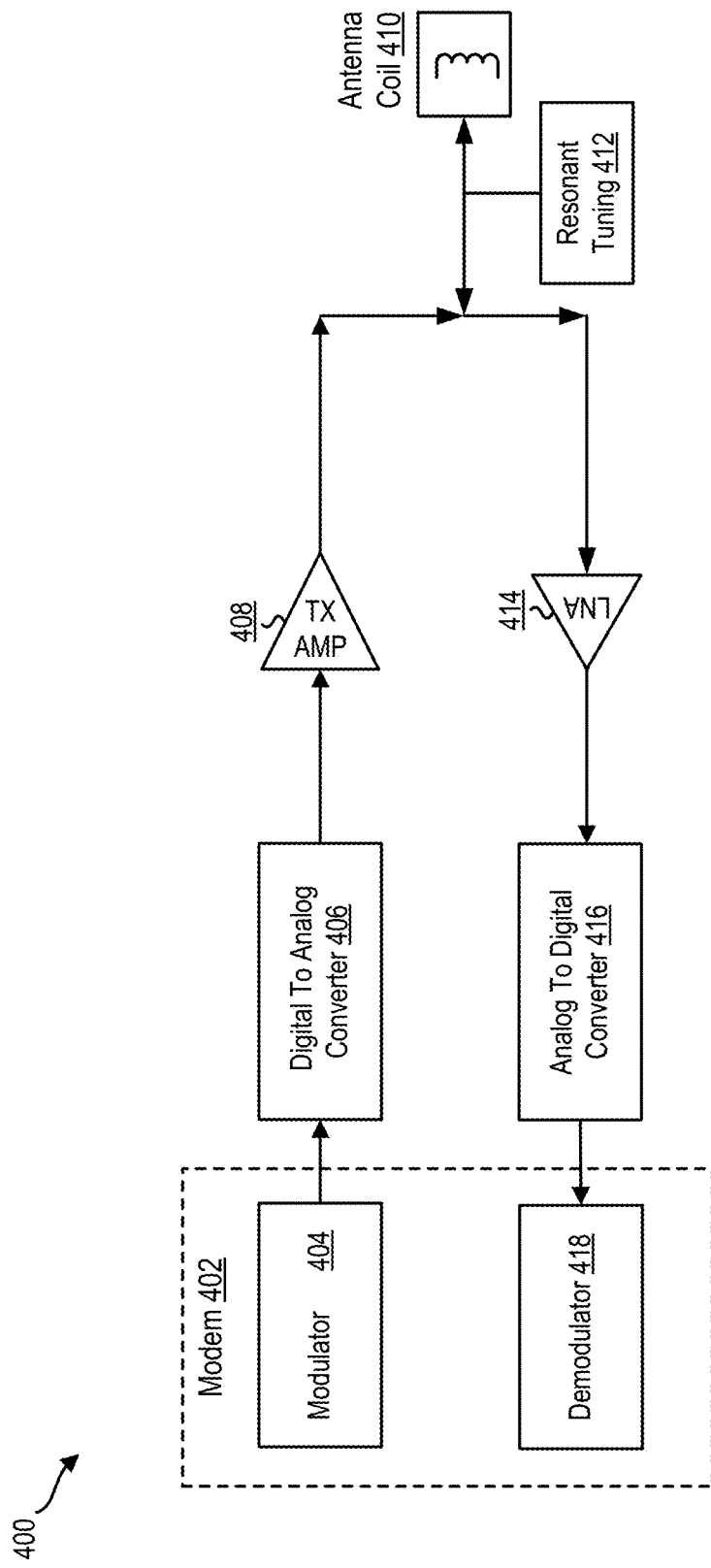
FIG. 4 shows a block diagram illustrating an example configuration of a near ultra-low energy field (NULEF) transceiver.

FIG. 4 shows a block diagram illustrating an example configuration of a near ultra-low energy field (NULEF) transceiver 400. Generally, the frequency of the magnetic signals transmitted by the NULEF transceiver 400 are relatively low, between approximately 9 MHz and 22 MHz, but may, with different sized antennas, be as wide as 1 MHz to 100 MHz. Therefore, up-conversion and down-conversion of a carrier frequency in the analogue domain is generally not necessary, which makes implementing the NULEF transceiver 400 considerably simpler than a typical wireless transceiver, i.e., as the NULEF transceiver 400 does not require mixers or local oscillator (LO) synthesizers, etc., in the analogue domain, but they can reside in the digital domain where a transceiver (TRX) design is often more power and area efficient.

On the transmit side, the carrier frequency can be digitally synthesized at the desired channel frequency and modulated with the data, using the desired modulation scheme, by the modulator 404 in the modem 402. The modulated carrier frequency is then converted to an analog signal by the digital-to-analog-converter (DAC) 406 coupled to the modulator 404. The output of the DAC 406, which may be a current or voltage, is coupled to the transmission (TX) amplifier 408, which can be implemented to amplify the analog signal, and delivered in the form of a current to the antenna coil 410. The current passing through the antenna coil 410 produces a magnetic field which is radiated into the medium surrounding the antenna coil 410, with maximum magnetic field strength perpendicular to the coil turns. The resonant tuning circuit 412 coupled to the antenna coil 410 consists of variable capacitors which can be tuned to form a resonant circuit with the antenna coil 410 inductance. Tuning to resonance can increase the effective gain of the NULEF transceiver 400, with gain proportional to the quality-factor of the antenna coil 410 and the variable capacitors therein, allowing the NULEF transceiver 400 to operate with very low power consumption in both transmit and receive modes.

On the receive side, the magnetic field of the received communication signal can induce current in the antenna coil 410 which is delivered to the low-noise-amplifier (LNA) 414. The LNA 414 will typically convert this current to a voltage which is amplified and sent to the analog-to-digital converter (ADC) 416 coupled to the LNA 414 output. The ADC 416 can be implemented to digitize the analog signal, and to deliver the digital signal to the demodulator 418, which is coupled to the ADC 416 output. The demodulator 418 can be implemented to detect the channel frequency, extract the data from the digital signal, and deliver it to the wireless device system bus for appropriate distribution.

During transmit mode, the LNA 414 input may be switched to high-impedance mode so the current is effectively delivered to the antenna coil 410, while during receive mode the TX amplifier 408 output can be programmed to high-impedance so that the receive current is effectively delivered to the LNA 414. Alternatively, series switches can be used to isolate transmit and receive paths of the NULEF transceiver 400. The NULEF transceiver 400 also may include other components in addition to those shown in FIG. 4.

FIG. 5A shows a frequency spectrum 500 of example carrier frequencies used in a NULEF magnetic communication system. The carrier frequencies of the signals or data may be in the range of 9 MHz to 22 MHz. For example, the carrier frequency may be one of 10.5 MHz, 12 MHz, 13.5 MHz, 15 MHz, 16.5 MHz, 18 MHz, 19.5 MHz, or 21 MHz. The frequency spectrum 500 includes eight channels (Channel Numbers 1-8), and three NULEF signals 503, 507 and 511 for transmission or for NULEF channel allocation by a NULEF transceiver, such as the NULEF transceiver 400 depicted and described in FIG. 4, operating in a source device, such as the electronic devices 102, 202 and 302, depicted and described in FIGS. 1-3B, respectively, or operating in a sink device, such as the earbuds 112, 114, 212, 214, 312 and 314, depicted and described in FIGS. 1-3B, respectively.

In some implementations, each NULEF signal may have a modulated portion (such as a modulated carrier or data) with a lower magnetic field strength and a residual unmodulated carrier portion with a proportionately higher strength. For example, the NULEF signal 503 may have a center frequency at 10.5 MHz (Channel Number 1), the NULEF signal 507 may have a center frequency at 13.5 MHz (Channel Number 3), and the NULEF signal 511 may have a center frequency at 18 MHz (Channel Number 6). The lower level portions of the NULEF signals 503, 507 and 511 may include modulated data and carriers, while at least part of residual unmodulated carriers 505, 509 and 513 are shown at the top and center of the NULEF signals 503, 507 and 511, respectively. In some implementations, the residual unmodulated carriers 505, 509 and 513 may be transmitted by the NULEF transceiver 400 operating in any of the electronic devices 102, 202 and 302. In some other implementations, the residual unmodulated carriers 505, 509 and 513 may be transmitted by the NULEF transceiver 400 operating in any of the earbuds 112, 114, 212, 214, 312 and 314.

In an alternative implementation, such as a receive side implementation, the received NULEF signals may have a same or similar frequency spectrum as shown in FIG. 5. For example, the three NULEF signals 503, 507 and 511 in the frequency spectrum 500 may be three received NULEF signals. Similar to as described above, each received NULEF signal may have a modulated portion (such as a modulated carrier or data) with a relevantly low magnetic field strength and a residual unmodulated carrier portion with a relatively high magnetic field strength level. In some implementations, the residual unmodulated carriers 505, 509 and 513 may be received by the NULEF transceiver 400 operating in any of the electronic devices 102, 202 and 302. In some other implementations, the residual unmodulated carriers 505, 509 and 513 may be received by the NULEF transceiver 400 operating in any of the earbuds 112, 114, 212, 214, 312 and 314.

In some implementations, the frequency spectrum 500 may include or represent a master/slave arrangement using a simplex NULEF channel allocation. Such a master/slave arrangement can be configured in a pico-net or pico-cell configuration. For example, Channel Number 6 may be assigned a simplex mode between two or more NULEF transceivers. One of the NULEF transceivers may act as a master and impose a time division multiplexing (TDM) format for a link where specific time slots would be allocated for transmission and reception. The other NULEF transceivers may be allocated a different channel so that NULEF communications may incorporate aspects of both frequency division multiplexing (FDM) and TDM. A TDM format may be applied to the link by a nominated master to allow intercommunication between all three parties (such as the electronic device 102 and the earbuds 112 and 114).

Figure 5B:
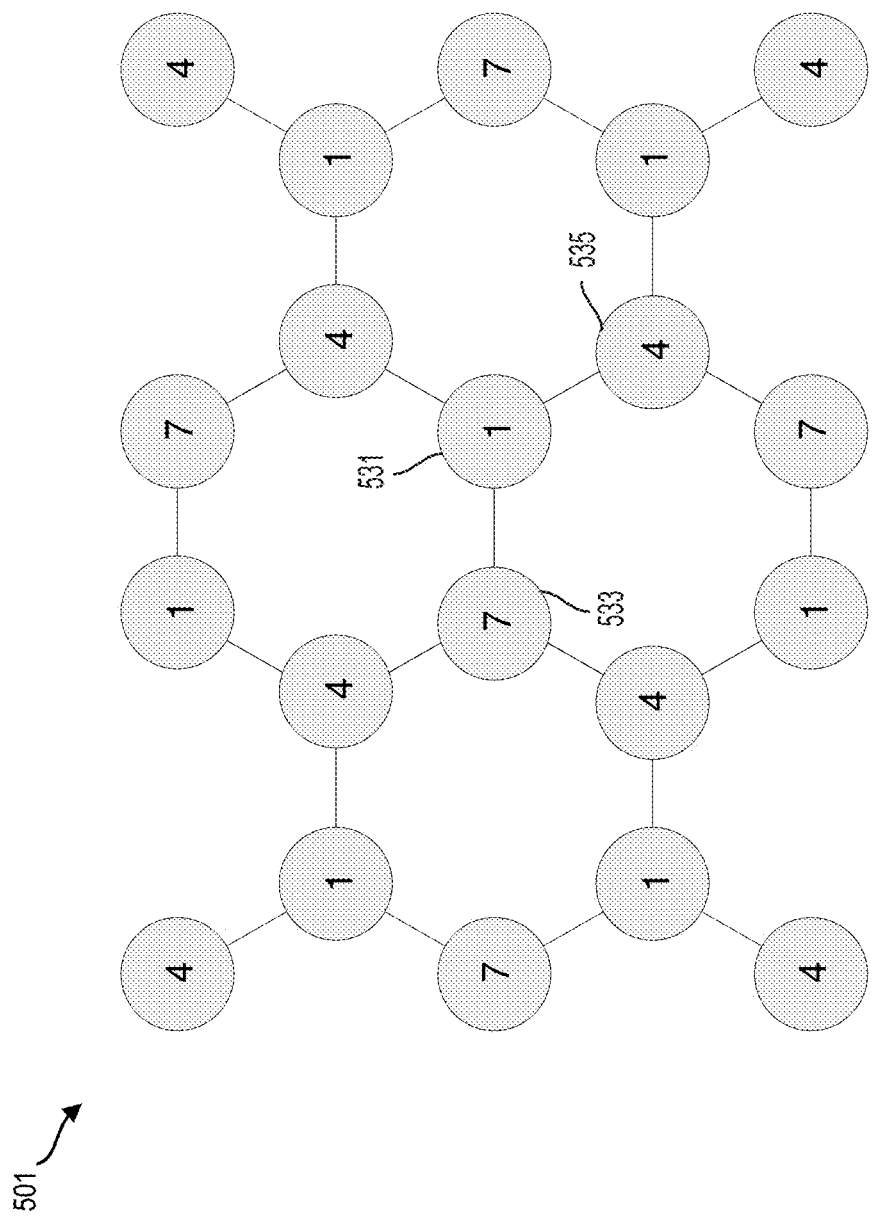
FIG. 5B shows a plan view of several example very local area networks (VLANs) in close proximity to one another, with neighboring example VLANs operating on different NULEF carrier frequencies.

FIG. 5B shows a plan view 501 of several example very local area networks (VLANs) in close proximity to one another, with neighboring example VLANs operating on different NULEF carrier frequencies. The plan view 501 may be representative of a seating arrangement in a crowded airport, train station, movie theatre, restaurant, sports arena, or any location having a plurality of seats or beds (such as a hospital) and able to have electronic device can be integrated therein, where multiple users in close proximity have their electronic devices connected in a VLAN configuration. For example, in the VLAN 531, a user may have a source device, such as the electronic devices 102, 202 and 302, depicted and described in FIGS. 1-3B respectively, in a wireless data transfer session with one or more sink devices, such as the earbuds 112, 114, 212, 214, 312 and 314, depicted and described in FIGS. 1-3B, respectively, over a magnetic communication link, such as NULEF. Similarly, the VLANs 533 and 535 may be representative of users connecting their various electronic devices together in the VLAN via a magnetic communication link. In a pico-cell local environment, such as on an airplane, or in a bus, etc., arranging the VLANs in a manner similar to that shown in FIG. 5B may enable spectrum efficiency optimization.

Even though the VLANs 531, 533 and 535 are in close proximity to one another, the users operating the various electronic devices in these VLANs will not experience co-channel interference due to the frequency division multiplexed (FDM) assignments. The potential for no interference, or reduced interference, is due to the unique ability of NULEF magnetic communication technology which helps mitigate interference due to magnetic field strength being proportional to the cube of distance from the transmitting device (versus electromagnetic radiation, or RF, strength being proportional to the square of distance from the transmitting device). As such, while the strength of the magnetic field from the VLAN 531 may reach the adjacent user in the VLAN 533, the magnetic field itself may not reach the user in the VLAN 533 due to third order magnetic field decay. Furthermore, since NULEF operates on eight non-overlapping channels (such as the Channel Numbers 1-8, depicted and described in FIG. 5A), the plan view 501 can be designed to reduce the potential for interference in any VLAN simply by assigning only three channels of the eight channels to users in the VLAN 531 (i.e., Channel Number 1), the VLAN 533 (i.e., Channel Number 7) and the VLAN 535 (i.e., Channel Number 4). A person having ordinary skill in the art will readily recognize that the NULEF channel assignment can be strategically repeated for other VLANs depicted in FIG. 5B, such that no adjacent VLANs are using the same NULEF channels. Furthermore, a person having ordinary skill in the art will readily recognize that the assignments of Channel Numbers 1, 4 and 7 are simply examples, and other channels can be substituted, or added to the plan view 501.

Figure 6:
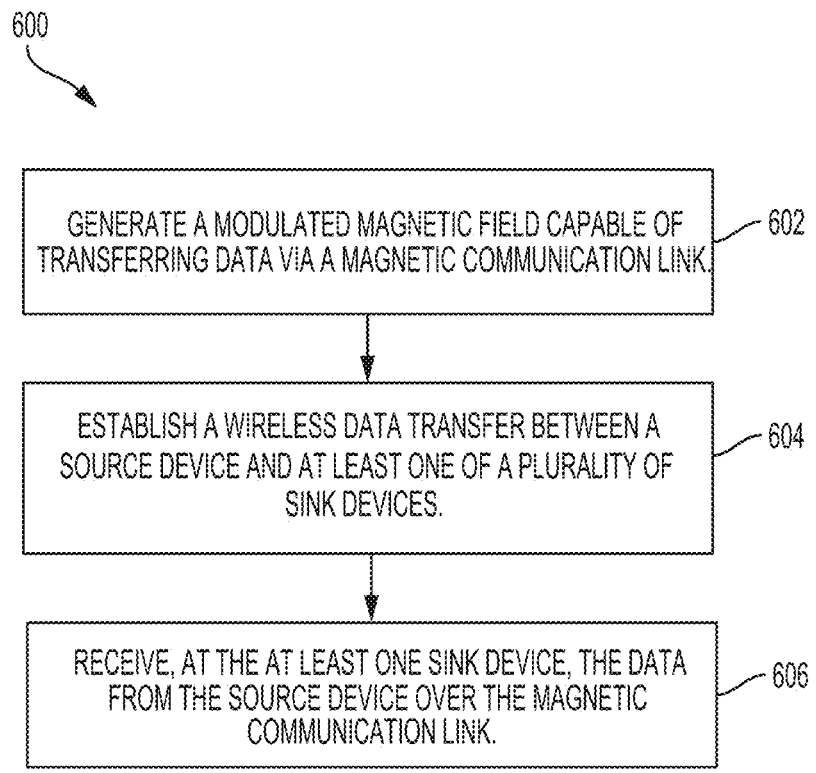
FIG. 6 shows an example method of communicating between a source device and a plurality of sink devices.

FIG. 6 shows an example method 600 of communicating between a source device and a plurality of sink devices. For example, the operations of the method 600 may be implemented by any of the source devices, such as the electronic devices 102, 202 and 302, as well as any of the plurality of sink devices, such as any of the earbuds 112, 114, 212, 214, 312 and 314, depicted and described in FIGS. 1-3B, or their components as described throughout.

In some implementations, the electronic devices 102, 202 and 302, and the earbuds 112, 114, 212, 214, 312 and 314, may execute a set of codes to control the functional elements of the respective device, or of one or more other devices, to perform the functions described in FIG. 6. Additionally, or alternatively, the electronic devices 102, 202 and 302, and the earbuds 112, 114, 212, 214, 312 and 314, may perform aspects of the functions described in FIG. 6 using special-purpose hardware.

A person having ordinary skill in the art will readily recognize that the nomenclature indicating a first sink device and a second sink device can be used interchangeably, and do not necessarily refer to a particular one of the earbuds 112, 114, 212, 214, 312 and 314, as described throughout this disclosure. In some implementations, the first sink device is intended to indicate that amongst a pair, a group, or a plurality, of sink devices, the source device first established a wireless connection, or wireless data transfer session, with the first sink device. As a corollary, the second sink device is intended to indicate that amongst a pair, a group, or a plurality, of sink devices, the source device secondly established a wireless connection, or wireless data transfer session, with the second sink device.

At block 602, a modulated magnetic field capable of transferring data via a magnetic communication link can be generated. In some implementations, a source device can generate a modulated magnetic field capable of transferring data via a magnetic communication link to at least one of the plurality of sink devices. In some implementations, the source device can be located within a seat headrest. The seat headrest may be included in, or associated with, any of the following: an airplane seat, a train seat, a subway seat, a car seat, a bus seat, a cinema seat, a restaurant seat, a sporting events seat, a hospital bed, a couch, a lounge chair, or in any of the seat headrests described with respect to FIG. 2. For example, any seat with a back (or headrest) that can incorporate an antenna coil (antcoil) approximately the size of a credit card can utilize the techniques disclosed herein. In some implementations, a headrest, while a convenient location to place an electronic device, may not be required, as the source device may be placed in the back of a seat, or in an armrest, etc., as long as the source device is in close enough proximity to the user while the modulated magnetic field (such as NULEF) is operating. In some implementations, the source device can perform central broadcasting using the modulated magnetic field. Such central broadcasting can be useful for user specific services, such as audio streaming (for example, Spotify, Pandora, etc.), and user profile acknowledgements (for example, check-in and user verification services, etc.), etc.

In some implementations, the generated magnetic communication link is a NULEF communication link. In some other implementations, the generated magnetic communication link is a near-field magnetic induction (NFMI) communication link. In yet some other implementations, the generated magnetic communication link is a near-field communication (NFC) communication link. In some implementations, the magnetic communication link operates on a single carrier frequency in a band between approximately 9 MHz and 22 MHz. In some implementations, the single carrier frequency is one of eight available carrier frequencies for the magnetic communication link's operation.

In some implementations, a centralized hub can be connected to the source device located within the seat headrest. The connection between the centralized hub and the source device located within the seat headrest can be an electrical connection, such as a wired connection (like as a powerline communication (PLC), or Ethernet connection, etc.), or a wireless connection (like any of the wireless communication technologies described throughout). In some implementations, the centralized hub can provide signals to a plurality of source devices within a local environment. The local environment can be implemented as a wide local area network (WLAN), a local area network (LAN), a very local area network (VLAN), or a personal area network (PAN).

In some implementations, the signals received from the centralized hub can be processed by a processor residing within, or associated with, the source device. In some implementations, the signals can be converted to the data at the source device. In some implementations, the source device can transmit the data over the generated magnetic communication link to at least one of the plurality of sink devices. In some implementations, the transmission range over the magnetic communication link can be defined according to the size of an antenna coil (also known as an antcoil), or coils, used in generating the modulated magnetic field. For example, for an antcoil about the size of a credit card, and located at the source device within the seat headrest, may be able to generate a modulated magnetic field having a range of approximately 1 meter (m). In such an implementation, an approximately 12 millimeter (mm) antcoil may be deployed in the one or more sink devices to properly receive the data over the generated magnetic communication link. A person having ordinary skill in the art will readily recognize that the range of such a system can be engineered to be larger or smaller depending on the system's design constraints.

At block 604, a wireless connection, or a wireless data transfer, between a source device and at least one of the plurality of sink devices can be established. The at least one sink device, or first sink device, can be dynamically selected from the plurality of sink devices. In other words, the dynamic selection of the first sink device from the plurality of sink devices means that a sink device was dynamically selected for wireless data transfer, and that sink device is now called the first sink device. The wireless data transfer, can be established over any suitable communication network described throughout this disclosure.

In some implementations, the wireless data transfer, can be established after determining that the first sink device is in closer proximity to the source device than another sink device, i.e., a second sink device. For example, the source device can be implemented to determine the relative distance between itself and the first sink device and the relative distance between itself and the second sink device, to dynamically select the sink device that is more proximate to the source device, and to establish a wireless data transfer with that sink device. Additionally, or alternatively, the plurality of sink devices can be implemented to determine the relative distances to the source device, to dynamically select whichever sink device is more proximate to the source device, before establishing a wireless data transfer session. The terms "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In some other implementations, the wireless data transfer can be established after determining that channel conditions between the source device and the first sink device are more favorable than channel conditions between the source device and the second sink device. For example, the source device can be implemented to determine if the channel conditions associated with the wireless data transfer with the first sink device are of higher quality, have a higher RSSI value, or experiencing less interference or attenuation, than the channel conditions associated with the wireless data transfer with the second sink device. In some implementations, the source device may only be able to communicate with the first sink device due to blockage, or other interference, causing disruption on the channel between the source device and the second sink device. Additionally, or alternatively, the sink devices can be implemented to determine which channel conditions are more favorable for establishing a wireless data transfer with the source device.

At block 606, data from the source device can be received at the at least one sink device, or first sink device, over the magnetic communication link. In some implementations, the data from the source device can include audio data, control data, or sensor data (such as data related to heart rate monitoring, body temperature, weight, positioning, proximity, pressure, thermal, optical, etc.). In some implementations, data received at the first sink device can be sent to another sink device, or second sink device, over a second magnetic communication link. Sending the data to the second sink device can include transmitting the data, forwarding the data, or otherwise relaying the data over the second magnetic communication link. In some implementations, sending the data to the second sink device occurs automatically. In some other implementations, sending the data to the second sink device is in response to a request from the second sink device.

In some implementations, the second magnetic communication link can be a different magnetic communication link technology than the magnetic communication link generated in block 602. In some other implementations, the second magnetic communication link can employ the same magnetic communication link technology as the magnetic communication link generated in block 602. In some implementations, the second magnetic communication link operates on a different carrier frequency of the eight available carrier frequencies than the magnetic communication link. In some implementations, the data can be received by the first sink device over a broadcasted transmission from the source device. Given the nature of broadcasted transmissions, in some implementations, the data also can be received by the second sink device. Additionally, or alternatively, other sink devices may be implemented to receive the data over a broadcasted transmission from the source device. For example, any sink device within range of the broadcasted transmission may be able to receive the data from the source device.

While the example method 600 in FIG. 6 includes three discrete blocks, a person having ordinary skill in the art will readily recognize that other blocks can be inserted between the depicted blocks. Additionally, other blocks may be performed before or after certain depicted blocks.

Figure 7:
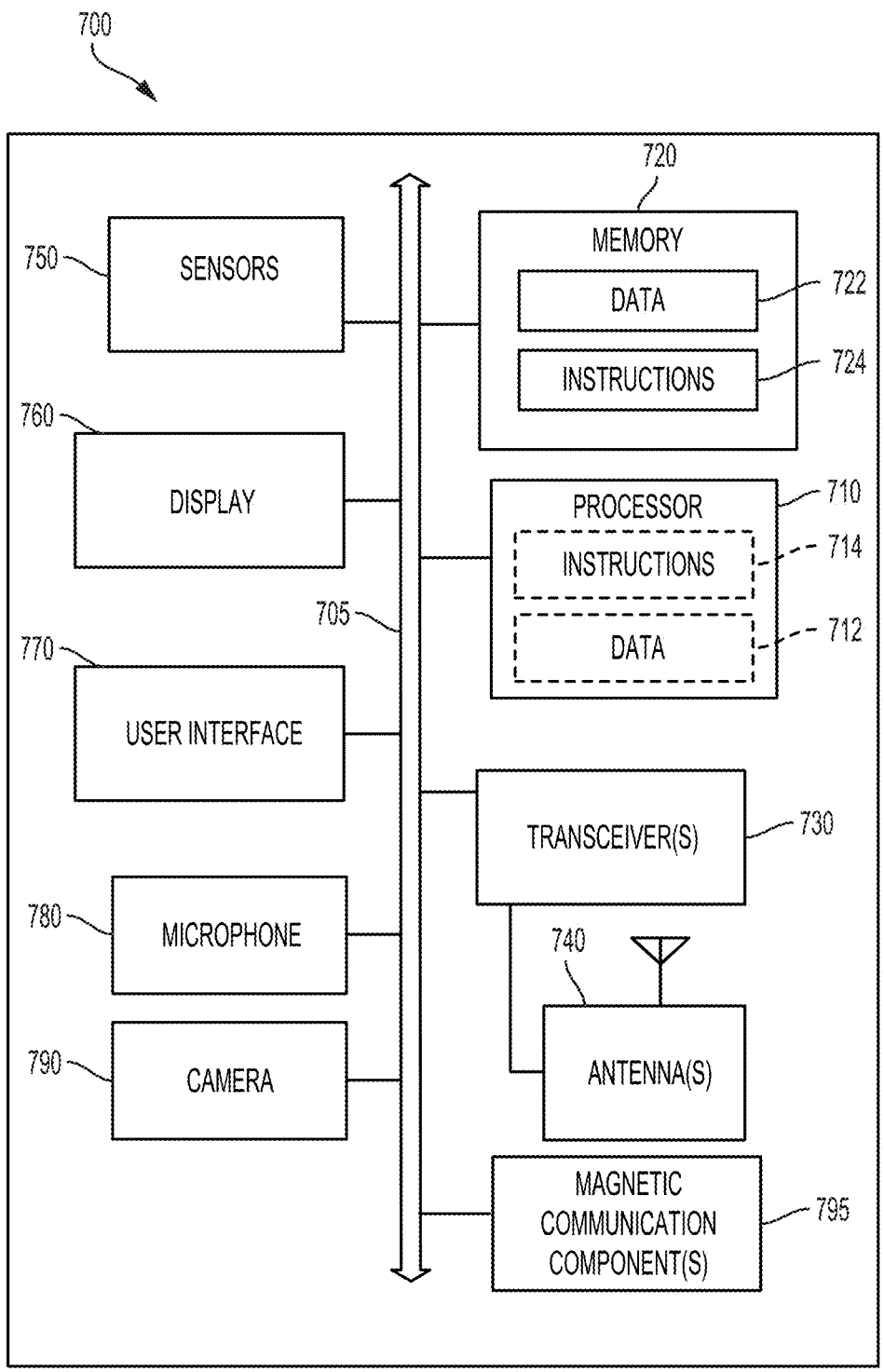
FIG. 7 shows a block diagram of an example source device.

FIG. 7 shows a block diagram of an example source device 700. The source device 700 is representative of a wide variety of electronic devices as described throughout, including and not limited to the electronic devices 102, 202 and 302, depicted and described in FIGS. 1-3B. In some implementations, the source device 700 can be implemented as the sink device 800, depicted and described below in FIG. 8, and vice versa.

The source device 700 can include a processor 710, a memory 720, at least one transceiver 730 (i.e., a transmitter and a receiver), and at least one antenna 740. The source device 700 also can include one or more sensors 750 (such as accelerometers, gyroscopes, weight, pressure, proximity, thermal or temperature, optical, etc.), a display 760, a user interface (UI) 770 (such as a keypad, touchscreen, voice or gesture interface), a microphone 780 (representative of a microphone and a speaker), a camera 790, and one or more magnetic communication components 795. Although not depicted, the source device 700 can include one or more network interfaces, such as a wireless network interface (like a cellular interface, a Wi-Fi, or other WLAN interface, a Bluetooth® interface, a BLE interface, a WiMAX interface, a ZigBee® interface, a Wireless USB interface, a magnetic communications interface, etc.) or a wired network interface (like as a powerline communication interface, an Ethernet interface, etc.). In some implementations, the source device 700 may support multiple network interfaces, each of which may be configured to couple the source device 700 to a different communication network. Each of the components (or "modules") described with reference to FIG. 7 can communicate with one another, directly or indirectly, over at least one bus 705. The bus 705 may include a power bus, a control signal bus, a status signal bus, a data bus, etc. Example buses 705 can include PCI, ISA, PCI-Express, HyperTransport®, InfiniBand®, NuBus, AHB, AXI, etc.

The processor 710 may be a general-purpose single- or multi-chip microprocessor (such as an Advanced RISC (Reduced Instruction Set Computer) Machine (ARM)), a special purpose microprocessor (such as a digital signal processor (DSP)), a microcontroller, a programmable gate array (such as a field programmable gate array (FPGA)), a shift register, etc. The processor 710 may be referred to as a central processing unit (CPU). Although just a single processor 710 is depicted in the source device 700 of FIG. 7, in alternative implementations, a combination of processors (such as an ARM and DSP) including multiple processors, multiple cores, multiple nodes, or implementing multi-threading, etc., can be used. The processor 710 may be a component of a processing system, further described below.

The source device 700 also includes memory 720 in electronic communication with the processor 710 (i.e., the processor can read information from and write information to the memory 720). Memory 720 can be deemed to be in electronic communication with the processor 710 if the processor 710 can read information from or write information to the memory 720. The memory 720 may be any electronic component capable of storing electronic information. The memory 720 may be configured as random-access memory (RAM), read-only memory (ROM), non-volatile random-access memory (NVRAM), magnetic disk storage media, optical storage media, flash memory devices in RAM, on-board memory included with the processor, erasable programmable read-only memory (EPROM), electrically erasable programmable read-only memory (EEPROM), registers and so forth, including combinations thereof.

Data 722 and instructions 724 may be stored in the memory 720. The instructions may include one or more programs, routines, sub-routines, functions, procedures, code, etc. The instructions may include a single computer-readable statement or many computer-readable statements. The instructions 724 may be executable by the processor 710 to implement the methods disclosed herein. Executing the instructions 724 may involve the use of the data 722 that is stored in the memory 720. When the processor 710 executes the instructions 724, various portions of the instructions 714 may be loaded onto the processor 710, and various pieces of data 712 may be loaded onto the processor 710.

A processing system may generally refer to a system or series of machines or components that receives inputs and processes the inputs to produce a set of outputs (which may be passed to other systems or components of, for example, the source device 700). For example, a processing system of the source device 700 may refer to a system including the various other components or subcomponents of the source device 700.

The processing system of the source device 700 may interface with other components of the source device 700, and may process information received from other components (such as inputs or signals), output information to other components, etc. For example, a chip or modem of the source device 700 may include a processing system, a first interface to output information, and a second interface to receive information. In some cases, the first interface may refer to an interface between the processing system of the chip or modem and a transmitter, such that the source device 700 may transmit information output from the chip or modem. In some cases, the second interface may refer to an interface between the processing system of the chip or modem and a receiver, such that the source device 700 may receive information or signal inputs, and the information may be passed to the processing system.

The memory 720 also can store processor- or computer-executable software code containing instructions that, when executed, cause the processor 710 to perform various functions described herein for magnetic communication, including generating a modulated magnetic field, transferring or transmitting data via a magnetic communication link, reception of a magnetic signal or magnetic data, and generation and transmission of an appropriate response magnetic signal or magnetic data.

The processor 710 processes information received through the transceiver 730 as well as information to be sent to the transceiver 730 for transmission through the antenna 740. Additionally, the processor 710 can process information received through one or more sensors 750 as well as information to be presented by the display 760.

In some implementations, the transceiver 730 can be implemented as both a transmitter and a receiver, and can modulate data, including data to be transmitted over a magnetic communication link, and provide the modulated data to the antenna 740 for transmission, as well as to demodulate data received from the antenna 740. In some such implementations, the transceiver 730 can be implemented as at least one RF transmitter and at least one separate RF receiver. In some other implementations, the transceiver 730 can be implemented as at least one magnetic communications transmitter and at least one separate magnetic communications receiver. The transceiver 730 may communicate bi-directionally, via one or more antennas, wired, wireless, or magnetic communication links as described above. For example, the transceiver 730 may represent a magnetic transceiver and may communicate bi-directionally with another magnetic transceiver, such as a magnetic transceiver associated with the sink devices, or the earbuds 112, 114, 212, 214, 312 and 314, depicted and described in FIGS. 1-3B. The transceiver 730 also may include a modem to modulate the packets and provide the modulated packets to the antennas for transmission, and to demodulate packets received from the antennas.

The display 760 can be implemented from any suitable display technology. For example, the display 760 can be implemented from a liquid crystal display (LCD), an e-ink display, a digital microshutter (DMS) display, or an interferometric modulator (IMOD) display. Additionally, the display 760 can be implemented as a flat-panel display, such as plasma, electroluminescent (EL) displays, organic light emitting diode (OLED) display, super twisted nematic (STN) display, or thin-film transistor (TFT) LCD, or a non-flat-panel display, such as a cathode ray tube (CRT) or other tube device. The microphone 780 and the camera 790 allow the source device 700 to be suitable for engaging in voice and video communications. The magnetic communication components 795 can be used to implement the magnetic communication system(s) and method(s) described above.

The source device 700 may include means for performing one or more operations described herein, such as the method 600, depicted and described in FIG. 6. In some aspects, such means may include one or more components of the source device 700 described in connection with the electronic devices 102, 202 and 302, depicted and described in FIGS. 1-3B, or the NULEF transceiver 400, depicted and described in FIG. 4.

Figure 8:
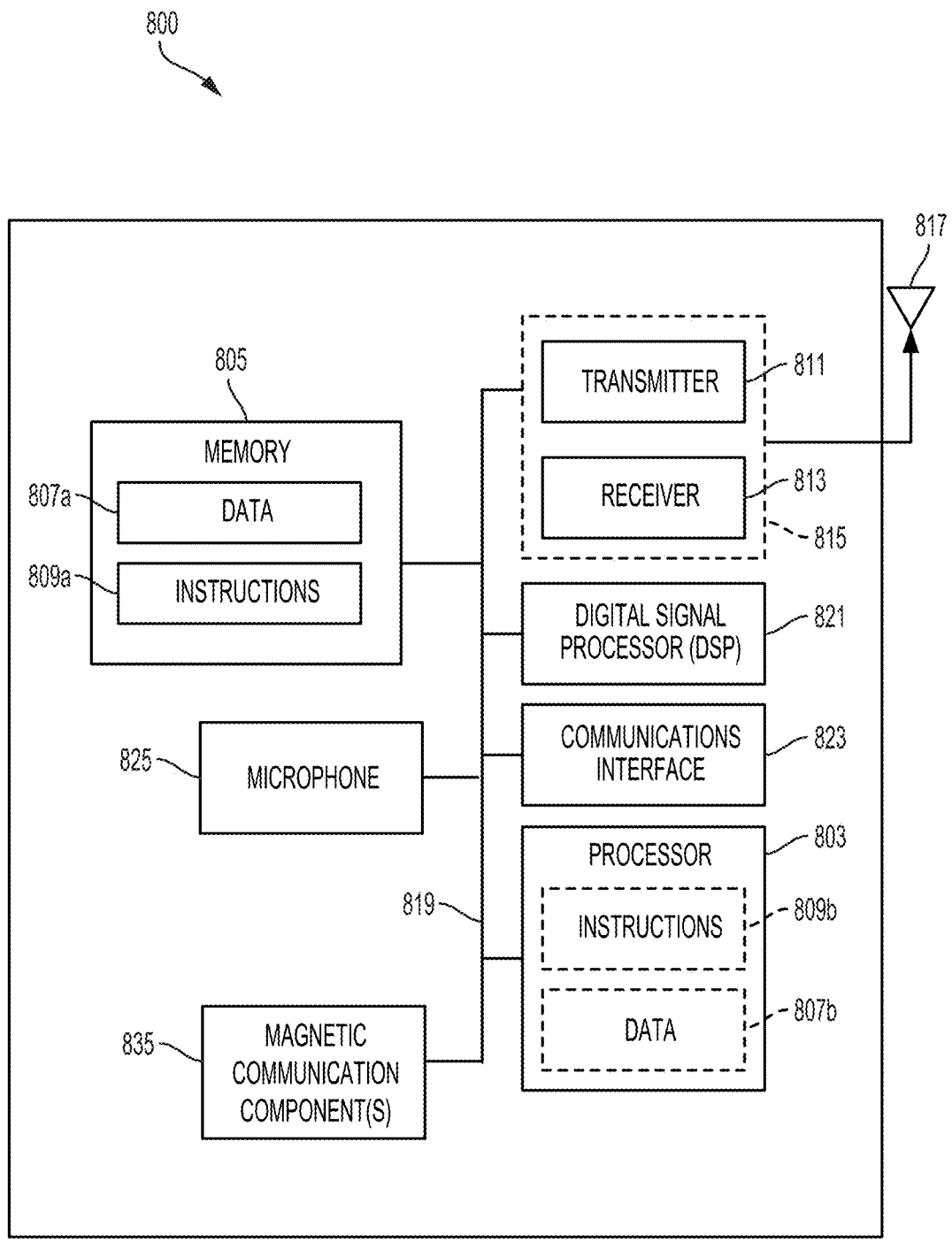
FIG. 8 shows a block diagram of example components that may be included within a sink device.

FIG. 8 shows example components that may be included within a sink device 800. The sink device 800 is representative of a wide variety of electronic devices as described throughout, including and not limited to the earbuds 112, 114, 212, 214, 312 and 314, depicted and described in FIGS. 1-3B. In some implementations, the sink device 800 can be implemented as the source device 700, depicted and described in FIG. 7, and vice versa.

The sink device 800 includes a processor 803. The processor 803 may be a general-purpose single- or multi-chip microprocessor (such as an Advanced RISC (Reduced Instruction Set Computer) Machine (ARM)), a special purpose microprocessor (such as a digital signal processor (DSP)), a microcontroller, a programmable gate array (such as a field programmable gate array (FPGA)), a shift register, etc. The processor 803 may be referred to as a central processing unit (CPU). Although just a single processor 803 is depicted in the sink device 800 of FIG. 8, in alternative implementations, a combination of processors (such as an ARM and DSP) including multiple processors, multiple cores, multiple nodes, or implementing multi-threading, etc., can be used. The sink device 800 also can include a processing system, as described with respect to the source device 700.

The sink device 800 also includes memory 805 in electronic communication with the processor 803 (i.e., the processor can read information from and write information to the memory 805). The memory 805 can be deemed to be in electronic communication with the processor 803 if the processor 803 can read information from or write information to the memory 805. The memory 805 may be any electronic component capable of storing electronic information. The memory 805 may be configured as random-access memory (RAM), read-only memory (ROM), non-volatile random-access memory (NVRAM), magnetic disk storage media, optical storage media, flash memory devices in RAM, on-board memory included with the processor, erasable programmable read-only memory (EPROM), electrically erasable programmable read-only memory (EEPROM), registers and so forth, including combinations thereof.

Data 807a and instructions 809a may be stored in the memory 805. The instructions may include one or more programs, routines, sub-routines, functions, procedures, code, etc. The instructions may include a single computer-readable statement or many computer-readable statements. The instructions 809a may be executable by the processor 803 to implement the methods disclosed herein. Executing the instructions 809a may involve the use of the data 807a that is stored in the memory 805. When the processor 803 executes the instructions 809, various portions of the instructions 809b may be loaded onto the processor 803, and various pieces of data 807b may be loaded onto the processor 803.

The memory 805 also can store processor- or computer-executable software code containing instructions that, when executed, cause the processor 803 to perform various functions described herein for magnetic communication, including reception of a signal, and generation, modulation and transmission of an appropriate magnetic response signal.

The sink device 800 also may include a transmitter 811 and a receiver 813 to allow transmission and reception of signals to and from the sink device 800 via one or more antennas 817. The transmitter 811 and receiver 813 may be collectively referred to as a transceiver 815. The transceiver 815 also may include a modem to modulate the packets and provide the modulated packets to the antennas for transmission, and to demodulate packets received from the antennas. The sink device 800 also may include (not shown) multiple transmitters, multiple antennas, multiple receivers, and multiple transceivers. For example, the transceiver 815 can be implemented as at least one RF transmitter and at least one separate RF receiver. Alternatively, the transceiver 815 can be implemented as at least one RF transmitter and receiver and at least one magnetic communication-based transmitter and receiver. Further, the transceiver 815 can be implemented as at least one magnetic communications transmitter and at least one separate magnetic communications receiver. The processor 803 processes information received through the transceiver 815 as well as information to be sent to the transceiver 815 for transmission through the antenna 817.

The transceiver 815 may communicate bi-directionally, via one or more antennas, wired, wireless, or magnetic communication links as described above. For example, the transceiver 815 may represent a wireless transceiver in a first sink device and may communicate with another wireless transceiver in a second sink device, such as the wireless transceivers associated with the earbuds 112, 114, 212, 214, 312 and 314, depicted and described in FIGS. 1-3B. Alternatively, the transceiver 815 may represent a magnetic communication-based transceiver in a first sink device and may communicate with another magnetic communication-based transceiver in a second sink device, such as the magnetic communication-based transceivers associated with the earbuds 112, 114, 212, 214, 312 and 314, depicted and described in FIGS. 1-3B.

The sink device 800 may include a digital signal processor (DSP) 821. The sink device 800 also may include a communications interface 823. The communications interface 823 can be implemented as a user interface (UI) (such as a keypad, touchscreen, voice or gesture interface), and may allow a user to interact with the sink device 800. The sink device 800 also may include a microphone 825 (representative of a microphone and a speaker) for playing audio data.

The magnetic communication components 835 can be used to implement the magnetic communication system(s) and method(s) described above. The various components of the sink device 800 may be coupled together by one or more buses, which may include a power bus, a control signal bus, a status signal bus, a data bus, etc. For the sake of clarity, the various buses are illustrated in FIG. 8 as a bus system 819.

The sink device 800 may include means for performing one or more operations described herein, such as the method 600, depicted and described in FIG. 6. In some aspects, such means may include one or more components of the sink device 800 described in connection with the earbuds 112, 114, 212, 214, 312 and 314, depicted and described in FIGS. 1-3B, or the NULEF transceiver 400, depicted and described in FIG. 4.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends on the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray™ disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine-readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method of communicating between a source device located within a seat headrest and a plurality of sink devices in a local area network (LAN), comprising:
   generating, at the source device, a modulated magnetic field capable of transferring data via a magnetic communication link, wherein the source device is electrically connected to a centralized hub;
   establishing a wireless data transfer between the source device and at least one of the plurality of sink devices; and
   receiving, at the at least one sink device, the data from the source device over the magnetic communication link.

2. The method of claim 1, wherein the centralized hub provides signals to a plurality of source devices, including the source device, within a local environment.

3. The method of claim 2, further comprising:
   converting, at the source device, the signals to the data; and
   transmitting the data over the magnetic communication link to at least one of the plurality of sink devices.

4. The method of claim 1, wherein the seat headrest is included in one of: an airplane seat, a train seat, a car seat, a bus seat, a cinema seat, a hospital bed, a restaurant seat, or a sporting events seat.

5. The method of claim 1, wherein the plurality of sink devices are one of a smartphone, an earbud, a pair of earbuds, a tablet device, and a wearable device.

6. The method of claim 1, wherein the magnetic communication link is a near-ultra low energy field (NULEF) communication link or near-field magnetic induction (NFMI) communication link.

7. The method of claim 6, wherein the magnetic communication link operates on a single carrier frequency of eight carrier frequencies, in a band between approximately 9 MHz to 22 MHz.

8. The method of claim 1, further comprising:
   sending the data from the at least one sink device to another sink device over a second magnetic communication link.

9. The method of claim 8, wherein the second magnetic communication link operates on a different carrier frequency of the eight carrier frequencies than the magnetic communication link.

10. The method of claim 8, wherein sending the data to the another sink device occurs automatically.

11. The method of claim 8, wherein sending the data to the another sink device is in response to a request from the another sink device.

12. A source device integrated in a headrest, in wireless communication with a plurality of sink devices in a local area network (LAN), comprising:
    a processing system configured to:
      generate a modulated magnetic field capable of transferring data via a magnetic communication link; and
      establish a wireless data transfer with at least one of the plurality of sink devices; and
    a first interface configured to output the data to the at least one sink device over the magnetic communication link, wherein the source device is electrically connected to a centralized hub.

13. The source device of claim 12, wherein the centralized hub provides signals to a plurality of source devices, including the source device.

14. The source device of claim 13, wherein the processing system is further configured to:
    convert the signals to the data; and
    transmit the data to the first interface over the magnetic communication link.

15. The source device of claim 12, wherein the headrest is included in one of: an airplane seat, a train seat, a car seat, a bus seat, a cinema seat, a hospital bed, a restaurant seat, or a sporting events seat.

16. The source device of claim 12, wherein the magnetic communication link is a near-ultra low energy field (NULEF) communication link or near-field magnetic induction (NFMI) communication link.

17. The source device of claim 16, wherein the magnetic communication link operates on a single carrier frequency of eight carrier frequencies, in a band between approximately 9 MHz to 22 MHz.

18. The source device of claim 12, wherein a bidirectional telephonic communication link is available through the headrest.

19. A non-transitory computer-readable medium comprising processor-executable program code configured to cause a processor of a source device located within a hospital bed to:
    generate a modulated magnetic field capable of transferring data via a magnetic communication link, wherein the magnetic communication link operates on a single carrier frequency of eight carrier frequencies, in a band between approximately 9 MHz and 22 MHz;
    establish a wireless data transfer between the source device and at least one of a plurality of sink devices; and
    transmit the data over the magnetic communication link to the at least one sink device.

20. The non-transitory computer-readable medium of claim 19, wherein a centralized hub is electrically connected to the source device, and the centralized hub provides signals to the source device.

21. The non-transitory computer-readable medium of claim 19, wherein the magnetic communication link is a near-ultra low energy field (NULEF) communication link or near-field magnetic induction (NFMI) communication link.

22. An apparatus of a source device located within a seat, comprising:
   means for generating a modulated magnetic field capable of transferring data via a magnetic communication link;
   means for establishing a wireless data transfer between the source device and at least one of a plurality of sink devices, wherein the source device is electrically connected to a centralized hub; and
   means for outputting the data over the magnetic communication link to the at least one sink device.

23. The apparatus of claim 22, wherein the magnetic communication link is a near-ultra low energy field (NULEF) communication link or near-field magnetic induction (NFMI) communication link.

24. The apparatus of claim 22, wherein the seat is included in one of: an airplane seat, a train seat, a car seat, a bus seat, a cinema seat, a restaurant seat, or a sporting events seat.

25. The apparatus of claim 22, wherein the centralized hub provides signals to a plurality of source devices, including the source device, within a local environment.

26. The apparatus of claim 25, further comprising means for converting the signals to the data.

\* \* \* \* \*